Figure 1:
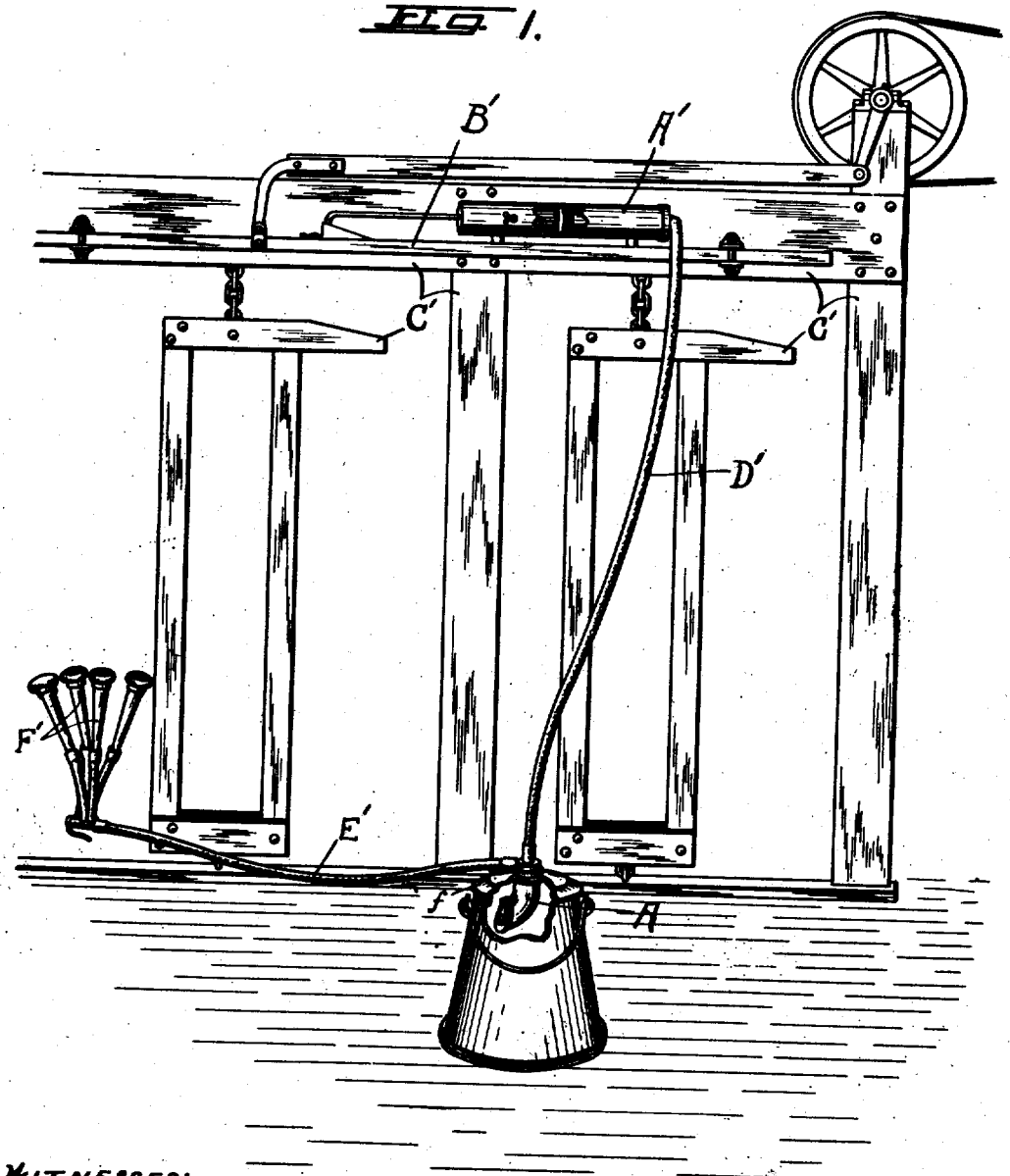

A. V. & R. L. HINMAN.

COW MILKING MACHINE.

APPLICATION FILED DEC. 11, 1914.

Reissued Feb. 9, 1915.

13,876.

2 SHEETS—SHEET 1.

WITNESSES:

H. Hurst.

E. A. Thompson

INVENTORS

Arthur V. Hinman &

BY Ralph L. Hinman

Howard P. Denison

ATTORNEY.

A. V. & R. L. HINMAN.

COW MILKING MACHINE.

APPLICATION FILED DEC. 11, 1914.

Reissued Feb. 9, 1915. 13,876.

2 SHEETS—SHEET 2.

WITNESSES:

H. W. Hurst.

E. A. Thompson

INVENTOR.

Arthur V. Hinman &

BY Ralph L. Hinman

Howard P. Denison

ATTORNEY.

UNITED STATES PATENT OFFICE.

ARTHUR V. HINMAN AND RALPH L. HINMAN, OF ONEIDA, NEW YORK.

COW-MILKING MACHINE.

13,876. Specification of Reissued Letters Patent. Reissued Feb. 9, 1915.

Original No. 1,097,803, dated May 26, 1914, Serial No. 711,744. Application for reissue filed December 11, 1914. Serial No. 876,750.

*To all whom it may concern:*

Be it known that we, ARTHUR V. HINMAN and RALPH L. HINMAN, citizens of the United States, residing at Oneida, in the county of Madison and State of New York, have jointly invented certain new and useful Improvements in Cow-Milking Machines, of which the following is a specification.

This invention relates to improvements in vacuum cow-milking machines of the valved milk chamber type, its object being to improve and simplify their construction and to provide an exceedingly simple, readily operated, easily cleaned, noiseless and highly efficient apparatus of that class for milking one cow, or, a number of cows simultaneously.

At present in machines of this type there is no way of automatically controlling the vacuum, so that with each pulsation of the piston of the air pump the entire contents of the milk chamber are emptied; and, there is no way to prevent the milk from entering at some point the center of the milk chamber during the milking stroke of the pump; and no way of preventing a portion of the milk being drawn from the milk chamber into the flexible tube connected with the pump, and even into the pump itself.

Our invention is mainly designed to overcome these defects by providing an improved and simpler apparatus and accessories.

Our invention is a development and improvement of the invention described in the specification of our prior Patent No. 907,236, Serial No. 410,608, granted December 22, 1908.

More especially the invention resides in the provision of a cow-milking apparatus, in which the hose leading from the suction pump is connected by means of a nipple to a milk chamber capable of being closed air tight, and opened by an automatic valve at its lower end, which valve is closed by gravity and atmospheric pressure during the out stroke of the pump piston, and which is opened during the in stroke of the pump piston by the weight and pressure of the milk against it as it is discharged from the milk chamber, the milk having previously been drawn thereinto upon the out stroke of said pump piston; thus permitting the apparatus to be attached to the cover, and used in connection with any receptacle of ordinary construction, without the necessity of providing a special air tight covering for the same.

The milk chamber may consist of two parts, a head or perpendicular part, and a body or curved part, easily joined together so as to form a unitary chamber, and easily separated for the purpose of cleaning, said parts having laterally projecting spaced flanges adapted to receive between them a portion of a milk pail cover. The body of the milk chamber may consist of two or more curved tubular parts, with a common upper part capable of being attached to the lower part of the head, and with two or more lower openings closed by automatic valves, instead of consisting of one curved part with one valve, the several valves being opened by the pressure and weight of the out-flowing milk, and closed by their own weight and by atmospheric pressure.

These, and various other features which constitute the special matter of the invention, will be readily understood from consideration of the following detailed description; the preferred embodiment of the invention being illustrated in the accompanying drawings, in which corresponding parts are designated by the same reference letters in the several views.

Figure 2:
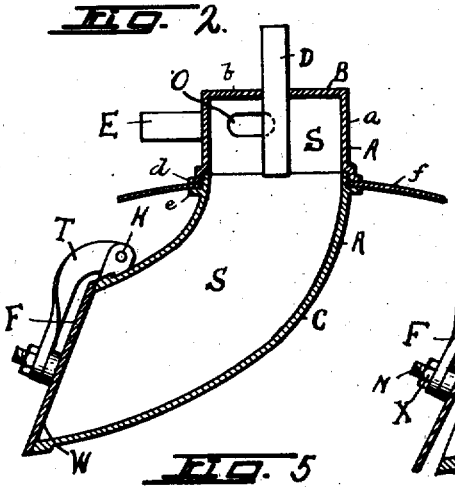
Figure 3:
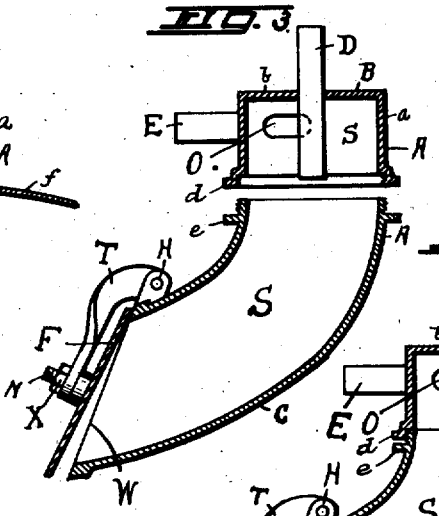
Figure 6:
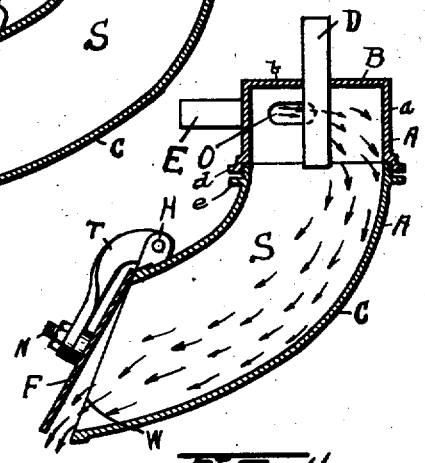
Figure 5:
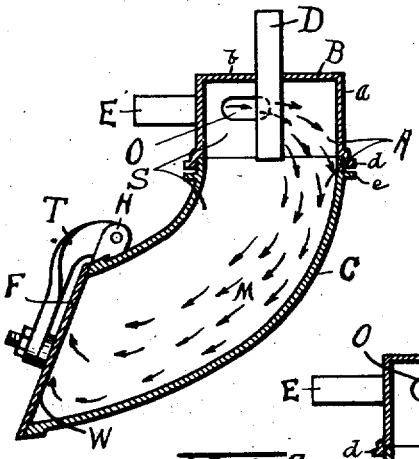
Figure 4:
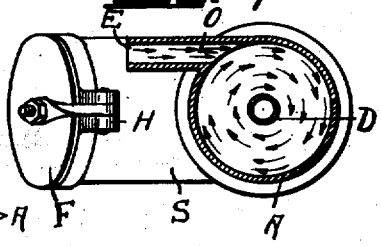
Figure 7:
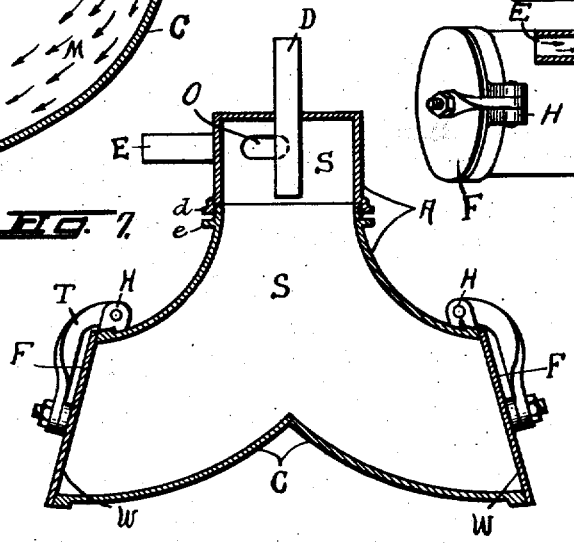

Figure 1 is a view of the milking apparatus as assembled for operation. Fig. 2 is a vertical section through the two-part milk receiving chamber. Fig. 3 is a view similar to Fig. 2 except the head and body are not joined, and showing the automatic valve of the body opened. Fig. 4 is a horizontal section of the head of the milk chamber and vertical and horizontal nipples. Fig. 5 is a vertical section of the curved body of the milk chamber and the vertical head, with milk flowing into the chamber through the horizontal nipple, with automatic valve closed. Fig. 6 is a similar view with milk flowing out of lower end of the milk chamber. Fig. 7 is a vertical view of the head and nipples, and the body composed of two elbow curved parts with two openings and valves.

Referring more particularly to the drawings, we have illustrated the invention as assembled and installed for operation.

A′ is designed to represent a piston pump having a suitable piston rod connected to a reciprocating bar B′ mounted upon the stanchion frames C′, as disclosed in our former patent above identified.

A represents a curved elbow shaped milk chamber consisting of two parts, a detachable head B, and a curved body C.

D represents a vertical nipple or tube, passing through the center of the detachable head B, and extending upward a sufficient distance so that a flexible hose D′ connected with the air pump A′ can be attached thereto; and extended downward through the top of the head a sufficient distance, so that its lower end is on a line with the lower edge of the head; E is a horizontal nipple, or tube, attached to and opening into the head B on a tangent with its circumference, to which can be attached a hose E′ connected with the teat cups F′; E does not extend into the head B beyond its interior circular surface, so that the opening of E into the head is oblong, represented by O, and is between the top of said head B and its lower edge. The head B is formed of two parts, a tubular section —*a*— preferably externally threaded at its upper end, and a cap or cover —*b*— having a depending internally threaded circumferential flange for receiving the threaded end of the part —*a*— and a laterally and circumferentially extending flange —*d*—.

C represents the curved body of the milk chamber with its upper end fitted to engage with the lower end of B, thus uniting the inside surfaces of B and C, so as to form a continuous smooth interior surface. The upper end of C is provided with a laterally and circumferentially extending flange —*e*— spaced in the assembled structure a sufficient distance from the flange —*d*— to receive between them a portion of a milk pail cover —*f*—. In the operation of assembling the device the upper end of the part C is thrust through an opening in the pail cover until the flange —*e*— contacts with the cover. The cap B is then screwed upon the body C until the flange —*d*— comes in contact with the pail cover, at which point the parts B and C are brought into such relative position as to form a smooth interior milk spreading surface. C is curved like an elbow, so that its upper part is vertical and its lower part nearly horizontal; the edge of the lower part of the opening of C extends beyond the upper edge thereof, so that the opening of the lower end of C, represented by W, is oblong, and is at an obtuse angle with the plane of the top of head B.

F represents a removable, revolving disk, or valve, ground to fit the lower opening C and is attached at H to the upper outer edge of the lower part of C by a removable arm T so it can be easily removed, and, so that it readily closes the lower end of C by its own weight.

Capital letter T represents a removable arm hung between lugs attached to the upper part of C near the edge of the opening W by a pin P passing through openings in the lugs and an opening in the upper part of arm T.

N represents a screw pin passing through an opening in the lower end of T and screwed into a boss in the center and on the outside of disk F.

X represents a nut which retains the arm in place upon the screw pin or stud N, the opening through which the screw pin passes being large enough to allow the screw pin to move freely therein and to revolve with the disk "F."

M represents milk flowing into and out of the milk chamber.

S represents the smooth, concave, circular milk spreading surface formed by the interior surfaces of the head B and body C.

The operation of the device is as follows:—When the air pump commences to exhaust the air through the nipple D from head B and curved body C of the milk chamber, the valve F rests against the edge of the opening at the lower end of C, and by its own weight and the pressure of air on its outer surface, closes the opening air tight and the milk M is drawn through the nipple E, and its oblong opening O, onto the smooth concave, circular milk spreading surface S, formed by the inner curved surface of head B, and is thereby caused to spread upon and cling to S, and to flow in a circular and downward direction on S, instead of flowing into the center of head B and body C of the milk chamber A; and thereby leaves an open space in the center of head B and body C filled with air, so that the air continues to be drawn from head B and body C through the lower end of nipple D until the end of the out stroke of the pump piston. At the return stroke of the piston, the weight of the milk M in body C, opens valve F automatically and the milk flows out of opening W into the receptacle provided for it. While the last of the milk is flowing from oblong opening W, there not being enough milk at that time in C to completely fill W, a small opening is left at the top of free opening W and valve F, and when the stroke of the piston is again started to exhaust the air from body C and head B of the milk chamber A, the opening W of body C is not completely closed at its upper part, while the lower part of the opening W is still kept partially closed by the out flowing milk; as the exhaust stroke continues a short distance the milk chamber A is almost completely emptied of the milk; and valve F by its own weight and by atmospheric pressure completely closes the opening W, and the milk from the cow again flows through nipple E into head B and body C of the milk chamber A. By reason of this action of the milk M and valve F it is impossible to flood body C and head B with milk, for, while there is milk enough in body C at the commencement of the exhaust stroke of the piston to keep the valve F from entirely closing the opening W, air can enter C, and continues to enter while the last of the milk is flowing out, but, as soon as there is not sufficient milk flowing out of W to keep F open, it closes automatically, and, there being only a small amount of milk left in C, it is impossible for it to be drawn upward to the lower end of nipple D, and, therefore, it is impossible for milk to enter nipple D, or the tubular connection with the air pump, or the pump itself. Also when the milk is drawn into head B through nipple E it cannot touch the lower end of D because it clings to and spreads upon S, the interior surface of head B and body C, and the force with which it enters and spreads gives it a rapid circular motion, and its own weight causes it at the same time to run downward in a circular manner, until at the time the lower part of C is filled with milk, the exhaust stroke of the piston is ended, and the weight of the milk and pressure of the flow opens valve F and the body C is emptied. This process is repeated as long as milking continues.

By having the milk M enter the milk chamber A through the nipple E on a tangent with the surface of B, and through the oblong opening O, used as a directing orifice, conterminous with S, the interior circular surface of head B, using S as a spreader and director, the milk spreads upon, clings to and whirls around upon the interior surface of B and C so that none of the milk reaches the center of B and C, which center is filled with air, and the exhaustion of the air through D is not interfered with, and it is not necessary to have any interior sleeve to protect the interior opening of D. By the use of a milk chamber curved like an elbow, and oblong opening W on an obtuse angle to the perpendicular, so that the valve F can be worked by gravity, by the out flowing milk, and by atmospheric pressure, the operation of the device is rendered automatic, extremely simple and exact.

There is no wearing of the parts, the valve F is easily removed for cleaning, the head B is attached to the body C by a thread and screw joint so the head B is easily removed from the body C and both can be quickly and easily cleaned.

It is unnecessary to make use of a special air tight receptacle in connection with this apparatus, nor is it necessary to render the vessel air tight by use of a special cover, therefore, as the milk chamber is rendered air tight by means of its automatic valve, and head, it can be employed with any ordinary receptacle, being supported in any manner upon the cover thereof, or otherwise, as preferred.

We claim:

1. In a cow milking apparatus, a milk chamber having a valveless inlet and a substantially air-tight valved outlet closed by gravity.

2. In a cow milking apparatus, a milk chamber with its upper end closed and provided with a perpendicular air exhaust nipple projecting into its upper end a short distance and having an open lower end, a horizontal nipple entering the milk chamber tangentially to the circumference thereof and at a point between the upper end of the milk chamber and lower end of the perpendicular nipple, a disk at the lower end of the milk chamber connected thereto so as to move into and out of contact with the edge of the lower end of the chamber to form an air-tight contact therewith, the movement of said disk being controlled by gravity, by the outflow of milk from the cylinder and by the exhausts of the air from the cylinder.

3. In a cow milking apparatus, an elbow shaped milk chamber that is air tight when closed, curved at an angle so that its upper part being in a vertical position its lower part is nearly horizontal, the edge of the opening at its lower end being at an angle obtuse to the plane of the top of its upper end, the opening being oblong, the lower edge of the opening extending beyond its upper edge, a disk secured adjacent to the upper part of said opening to move into and out of contact with the edge of the same so as to form an air tight contact therewith, the movement of said disk being controlled by gravity, by the outflow of milk from the chamber and by the exhaust of air from the chamber, the upper end of said cylinder being closed air tight by a removable cap, said cap provided with a perpendicular nipple projecting through its center a short distance, said cap being provided with a horizontal nipple near its upper end and entering the milk chamber tangentially to the surface thereof, so that the opening of said nipple into the chamber is oblong and above the lower end of the perpendicular nipple projecting through the cap.

4. In a milking apparatus, a tubular milk chamber, an inlet entering said chamber substantially tangentially to the surface thereof, and means for discharging milk therefrom.

5. In a milking apparatus, a tubular milk chamber, an inlet to said chamber adapted to discharge milk tangentially to the inner surface thereof and means for discharging milk therefrom.

6. In a milking apparatus, a tubular milk chamber, an air exhaust pipe projecting downwardly substantially centrally of said chamber, a milk inlet meeting said chamber substantially tangentially to the surface thereof, and means for discharging milk from said chamber.

7. In a milking apparatus, a tubular milk chamber, an air exhaust pipe entering said chamber, an inlet entering said chamber substantially tangentially to the surface thereof and above the plane of the end of the air exhaust pipe, and means for discharging milk therefrom.

8. In a cow milking apparatus an elbow shaped milk chamber, curved at an angle so that its upper part being in a vertical position its lower part is nearly horizontal, the edge of the opening at its lower end being at an angle obtuse to the plane of the top of its upper end, the opening being oblong, the lower edge of the opening extending beyond its upper edge, a removable self adjusting, revolving, ground disk adapted to open and close the oblong opening, a removable arm with its upper end hung by a removable pin between two lugs fastened above the upper edge of the oblong opening, a removable screw pin passing through an opening in the lower end of the arm and into a boss on the center of the outside of the disk, a nut which retains the arm in place upon the screw pin or stud, the opening being large enough to allow the pin to move freely therein and the disk to freely revolve with the pin and nut, and the disk to be easily brought into air-tight contact with the edge of the opening, the movement of said disk and arm in opening and closing the lower end of the milk chamber being controlled by gravity and by the outflow of milk from the chamber and by the exhaust of air from the chamber, by the action of the air pump.

9. In a milking apparatus, a tubular milk chamber, a substantially vertical air exhaust pipe depending within said chamber, a substantially horizontal inlet pipe entering said chamber tangentially to the surface thereof, and means for discharging milk from said chamber.

10. In a milking apparatus, a tubular milk chamber, a substantially vertical air exhaust pipe depending within said chamber, a substantially horizontal inlet pipe entering said chamber tangentially to the surface thereof, and above the plane of the end of the air exhaust pipe, and means for discharging milk from said chamber.

11. In a cow milking apparatus, a milk chamber having a valveless inlet, means for exhausting air from the chamber and a substantially air tight valved outlet closed by gravity and the exhaust of air from said chamber.

12. In a cow milking apparatus, a milk chamber having a valveless milk inlet, an air exhaust connection, a milk outlet and an outlet valve positioned outside said chamber and closed by gravity and the exhaust of air from said chamber.

13. In a cow milking apparatus, a milk chamber having a valveless milk inlet, an air exhaust connection, a milk outlet, a valve for said outlet, and means located outside the milk chamber for supporting said valve.

14. In a cow milking apparatus, a milk chamber having a valveless milk inlet, an air exhaust connection, a milk outlet, a valve for said outlet, said valve positioned outside the milk chamber, and means located outside the milk chamber for supporting said valve.

15. In a cow milking apparatus, a milk chamber having a valveless milk inlet, an air exhaust connection, a milk outlet, a valve for said outlet, said valve positioned outside the milk chamber, and means located outside the milk chamber for supporting said valve in position to be brought into air tight relation with the milk outlet by the exhaust of air from said chamber.

16. In a cow milking apparatus, a milk chamber having a milk inlet in substantially continuous communication with said chamber during the milking operation, a milk outlet and a valve for said outlet, said valve supported by means located entirely outside the milk chamber.

17. In a cow milking apparatus, a milk chamber having a milk inlet, an air exhaust connection, a milk outlet, a valve for said outlet, said valve supported by means located outside the milk chamber and adapted to discharge milk into a receptacle at substantially normal atmospheric pressure.

18. In a cow milking apparatus, a tubular member constituting a milk chamber and formed of two separate parts removably connected together, said parts having their adjacent edge portions adapted to be spaced apart, milk inlet and air exhaust connections with said chamber, and a valved outlet for said chamber.

19. In a cow milking apparatus, a milk chamber comprising two separate removably connected members having parts adapted to be normally spaced for receiving between them the cover of a milk receptacle, a milk inlet, an air exhaust connection, and a valved outlet.

20. In a cow milking apparatus, a milk chamber formed of a tubular body section and a cap removably connected thereto, a milk inlet and an air exhaust in connection with the cap, a milk outlet in connection with the body portion, a valve for said outlet, said valve located outside said chamber and adapted to be brought into substantially air-tight relation with said outlet by the exhaust of air from said chamber.

21. In a cow milking apparatus, a milk chamber having a valveless milk inlet, a valveless unobstructed air exit, and a valved outlet for the milk.

22. In a cow milking apparatus, an elbow shaped milk chamber curved at an angle so that its upper part being vertically disposed its lower part is nearly horizontal and terminates in a valved outlet, a milk inlet, and means for exhausting the air from said chamber.

In witness whereof we have hereunto set our hands this 7th day of December, 1914.

ARTHUR V. HINMAN.
RALPH L. HINMAN.

Witnesses:
CHARLES R. HOYT,
MAYE I. HINMAN.